Oct. 21, 1958    M. SMOLENSKY    2,856,958
FORESHORTENED CHECK VALVE CONSTRUCTION
Filed March 24, 1955

INVENTOR.
MICHAEL SMOLENSKY
BY Golrick and Golrick
ATTORNEYS

2,856,958

FORESHORTENED CHECK VALVE CONSTRUCTION

Michael Smolensky, Cleveland Heights, Ohio

Application March 24, 1955, Serial No. 496,497

2 Claims. (Cl. 137—542)

The present invention is concerned with improvements in check valves.

Figure 1:
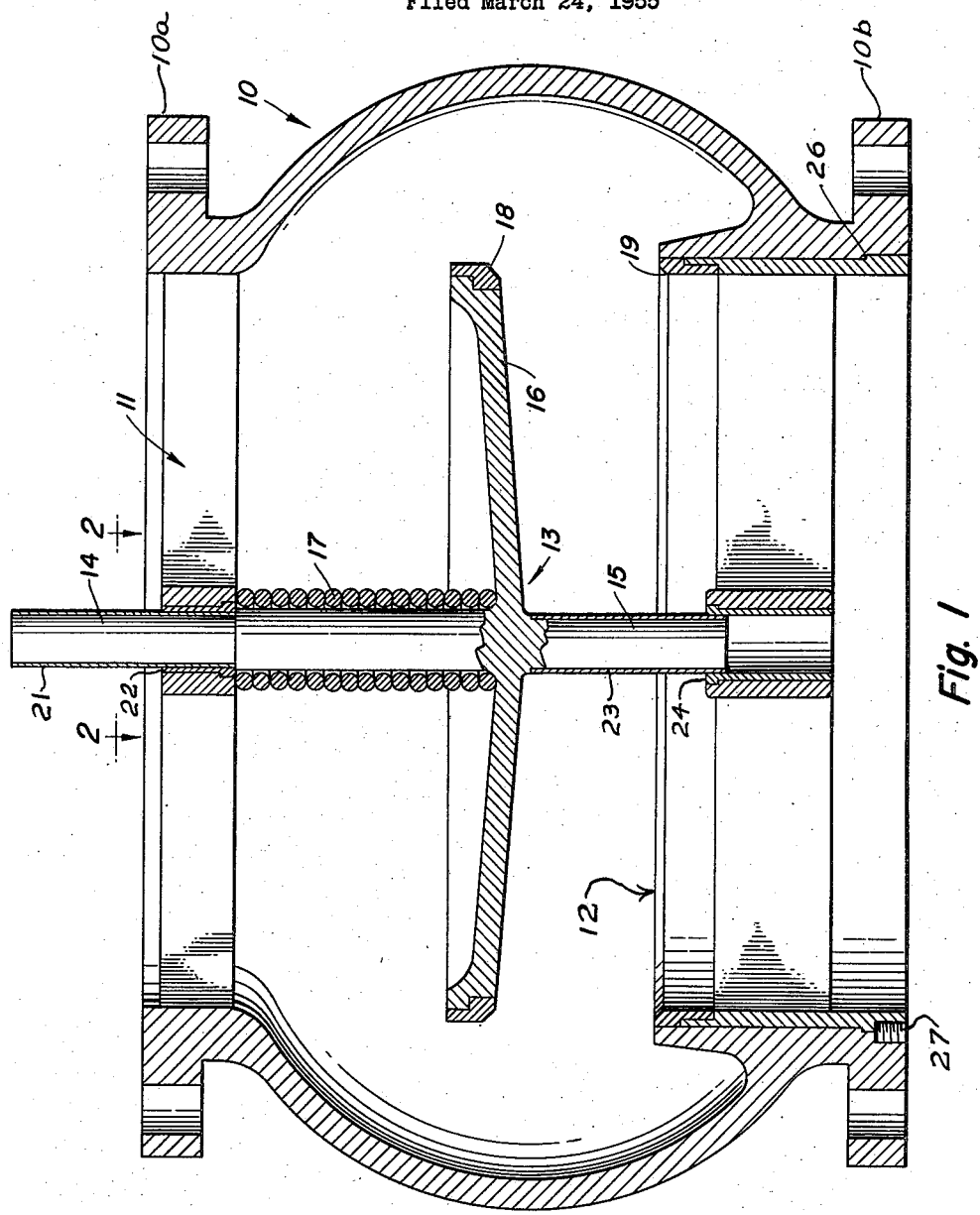
Figure 2:
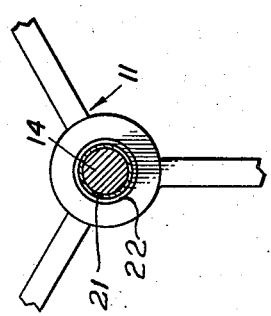

Often check valves must be installed in locations where axial dimensions of the valve required to handle the fluid or liquid pressures of the particular service render maintenance or the very installation difficult. The valve of the present invention as one of its primary features and objects provides a valve body structure, movable valve element and supporting means for the latter which permit a foreshortening of the valve body, despite the degree of movement required in the valving element and the flow areas required for a given service. Further the present invention provides a valve structure of excellent reverse flow checking characteristics which is simple and economical with respect to material demands and labor costs involved in fabrication. Other objects and advantages of the invention will appear from the following description and drawings wherein:

Fig. 1 shows the valve structure of this invention in axial section, the valve being shown with the movable valve element in full open position; and Fig. 2 is a fragmentary detail of the spider structure supporting the movable element at the outlet or upper end of the valve, viewed as indicated by the lines 2—2 in Fig. 1.

The present invention, as shown in Fig. 1, is embodied in a valve having a hollow cast metal body 10, in form roughly a spheroid flattened at the ends with parallel flange formations 10a and 10b located about the upper or outlet end and lower or inlet end respectively, each provided with the usual series of flange bolt holes. The inlet and outlet openings, substantially equal in diameter and therefore in flow cross section, are spanned by an integrally cast outlet spider structure 11 and a spider insert 12—the latter being of hollow cylindrical form to provide an inlet passage—for support of the movable valve element indicated by the general reference numeral 13.

The movable element 13 is comprised of coaxially aligned stud portions 14, 15 projecting from the center of a disk-like body portion 16 to form a guide rod structure slidable in aligned central bores of the spider hub portions. A helical compression spring 17 disposed about the upper stud or rod 14 and between the hub of spider 12 and disk 16 biases the whole valve element 13 normally toward a closed position, that is, downwardly to bring the externally beveled rim portion 18 thereof into sealing relation with the internal or female beveled seat 19 of insert 12. These bevels are of course disposed coaxially to the common axis of the guilde rods of the element 13 and of bores in the spider hubs. As here shown a bearing sleeve 21 on the upper end of rod 14 and a bearing bushing 22 in the hub bore of spider 11, and a similar sleeve and bushing pair 23, 24 for the lower shaft 15 and spider hub, are of suitable materials to minimize sliding friction throughout the valve life thereby maintaining quick valve response to fluid flow conditions.

The spring 17 is here open throughout its length, no shield or housing being provided as is common practice, so that at various times the fluid flow itself, directed back toward the spring by the shape of the valve body, tends to clean both the spring and underlying upper guide rod maintaining freedom of movement of the elements. The compressed length of spring 17 serves as a stop for element 13 at full open position.

The insert 12, generally cylindrical in external shape, is fitted in a corresponding cylindrical bottom opening into the interior of the valve body 10, but the latter is counterbored and the former shouldered at its lower end to form radial abutting surfaces at 26 determining the innermost position of the spider insert. The cylindrical bottom opening has a diameter slightly greater than that of rim insert 18 to admit the valve element 13 into the body 10. About the bottom opening of the body 10 there is an integrally cast, generally cylindrical, axially inwardly extended flange supporting the length of the insert which also serves to support circumferentially the seat portion against radial deformation. The insert preferably is accurately slip fitted into the body and is held in assembled position with its bottom edge substantially coplanar with the bottom flange face, as determined by the shoulder relation at 26, by one or more screws 27 threaded from the flange face into the adjoining surfaces of the insert 12 and valve body. The diameter of the insert 12 is such, relative to the inside diameter of the piping with which the particular valve is intended to be used, that the insert has additional support, when the valve closes under reverse presusre, from the flange end of the pipe to which the lower end of the valve is bolted.

The seating surfaces 18 and 19 may be annular elements respectively internally and externally shouldered and press fitted into position onto the complementary portions of disk 16 and inner end of insert 12 so that special alloy material may be used for these elements which has advantageous characteristics for valve seating and life.

By the use of the spheroidal shape of body 10 sufficient flow area about the valve disk 16 when in open position may be attained relative to the normal flow area of the valve inlet and outlet and connected piping, and the curved shape of the valve interior as shown and also the shallow male cone surface of the underside of the disk 16 help to minimize friction losses, so that the pressure drop of fluid passing through the valve is kept to a minimum.

Further in this valve structure, a decided foreshortening of the valve body length, along with the necessary opening stroke carrying the movable element 13 from closed to open position near but slightly beyond a maximum body diameter, is attained by locating the seat 19 on the long insert 12 well into the valve interior and by use of the top spider 11 located quite proximate to the upper flange face in a short outlet opening permitting the guide rod 14 to project beyond the upper flange face when the movable element 13 is in open position as in Fig. 1, rather than maintaining all parts of the valve within the body at all times. Hence the overall length of element 13 may be substantially that of the valve body; but with disk 16 located on the overall length span of rods 14, 15 as shown, when the valve is not yet installed and element 13 is biased to closed position the guide rods are both within the confines of the body preventing accidental damage in handling or shipping. Hence there results a valve more compact in axial dimensions with correlative advantages both in material saving and in the axial space required for valve installation.

I claim:

1. A check valve comprising a hollow cast metal body of generally oblate spheroidal form having a short outlet passage through one flattened end of the spheroid and a longer inlet opening at the opposite flattened end, the valve body having an integral spider structure located in the outlet passage proximate to the valve exterior, a bearing sleeve supported by the spider structure, an axially inwardly extended annular flange about the inlet opening integral with the body, a hollow cylindrical insert removably secured in the inlet opening supported by said flange, said insert providing at its inner end a seat formation spaced from the spheroid center toward the inlet end of the body and including a second spider structure spaced outwardly from said seat, said second spider structure supporting a bearing sleeve, a movable valve element within the body including a guide rod structure with ends provided with bearing sleeves slidable in the bearing sleeves supported by the said spider structures and carrying toward the inlet end a transversely disposed disk-like portion in diameter smaller than the inlet opening of the body and movable under forward fluid flow from said seat to an open position beyond the spheroid center, and a compression spring disposed about the guide rod between the first said spider structure and the disk portion to bias said element toward closed position against said seat, the length of the body being approximately and no less than that of the guide rod structure and the relative location of the disk portion being so located on the latter that the movable element is entirely within the body at closed position and the guide rod structure projecting axially therefrom at open position, whereby the body may be shortened for a required valve opening stroke of the movable element.

2. A check valve comprising a hollow cast metal body of generally oblate spheroidal form having a short outlet passage through one flattened end of the spheroid and a longer inlet opening at the opposite flattened end, the valve body having an integral spider structure located in the outlet passage proximate to the valve exterior, an axially inwardly extended annular flange about the inlet opening integral with the body, a hollow cylindrical insert removably secured in the inlet opening supported by said flange, said insert providing at its inner end a seat formation spaced from the spheroid center toward the inlet, a second spider structure spaced outwardly from said seat within said inlet opening, said spider structures carrying bearing sleeves, a movable valve element within the body including a guide rod structure with ends having bearing sleeves slidably supported in the bearing sleeves carried by said spider structures and carrying toward the inlet end a transversely disposed disk-like portion movable under forward flow pressure from said seat to an open position beyond the spheroid center, and a compression spring exposed to fluid flow and disposed about the guide rod between the first said spider structure and the disk portion to bias said element toward closed position against said seat, the length of the body being approximately and no less than that of the guide rod structure and the disk portion being so located on the latter that the movable element is entirely within the body at closed position and the guide rod structure projecting axially therefrom at open position, whereby the body may be shortened for a required valve opening stroke of the movable element.

References Cited in the file of this patent
UNITED STATES PATENTS

| | | |
|---|---|---|
| 377,758 | Jewell | Feb. 14, 1888 |
| 442,284 | Craig | Dec. 9, 1890 |
| 1,072,673 | Thelen | Sept. 9, 1913 |
| 2,102,289 | Smolensky | Dec. 14, 1937 |
| 2,268,119 | Honstetter | Dec. 30, 1941 |
| 2,301,276 | Gussick | Nov. 10, 1942 |